June 9, 1931.  C. M. ROOT  1,808,972
GATE
Original Filed Dec. 29, 1925  2 Sheets-Sheet 1
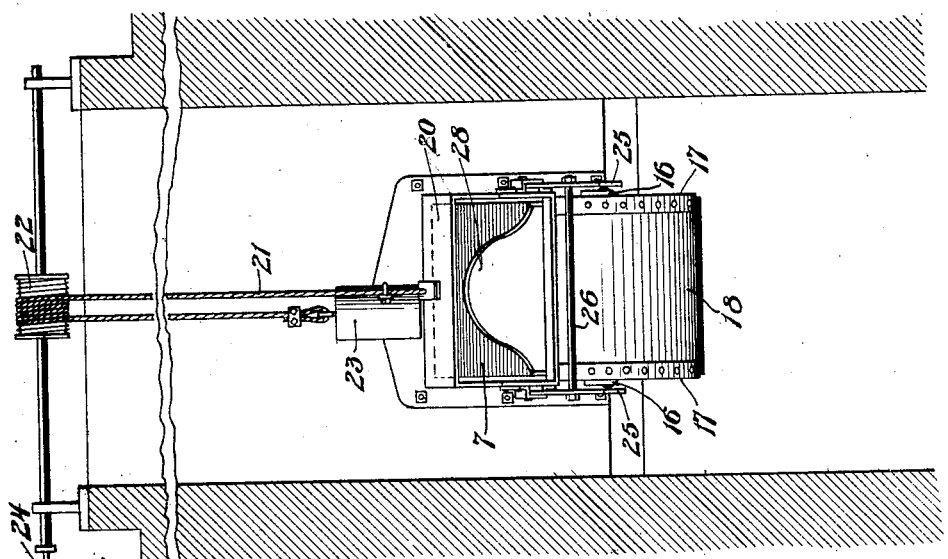
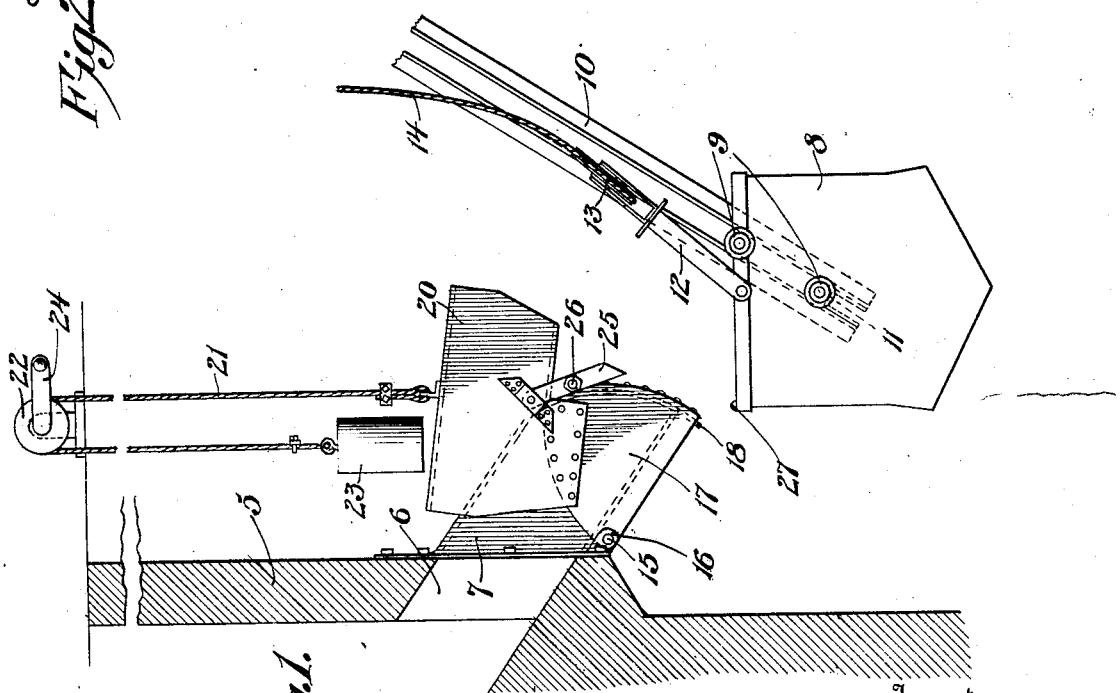

June 9, 1931. C. M. ROOT 1,808,972
GATE
Original Filed Dec. 29, 1925 2 Sheets-Sheet 2
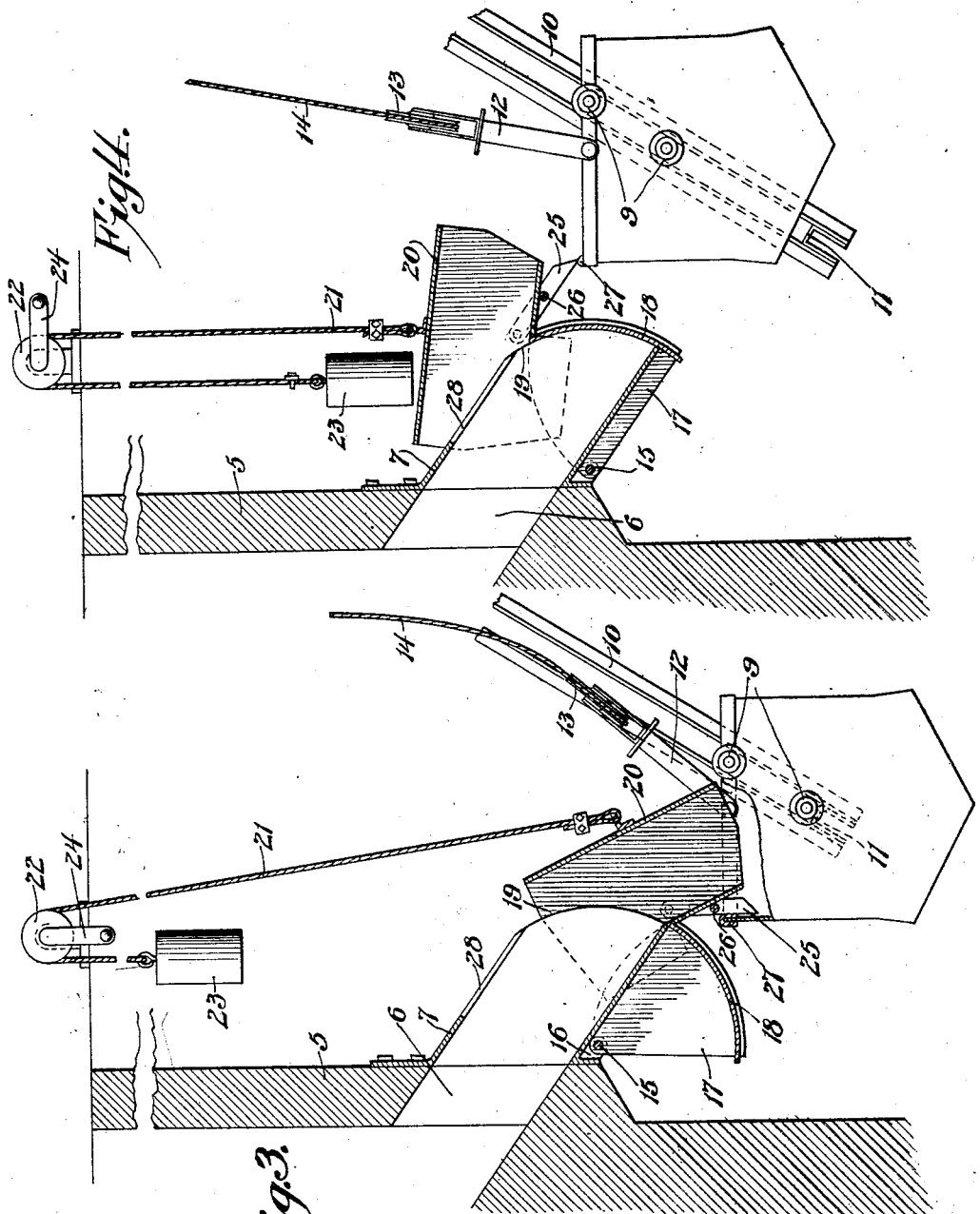
Witnesses
Chas. L. McDonald
E. N. Lovewell
Inventor
Clair M. Root
By
E. G. Siggers
Attorney Patented June 9, 1931

1,808,972

UNITED STATES PATENT OFFICE

CLAIR M. ROOT, OF DETROIT, MICHIGAN, ASSIGNOR TO GIFFORD-WOOD COMPANY, OF HUDSON, NEW YORK, A CORPORATION OF NEW YORK

GATE

Application filed December 29, 1925, Serial No. 78,163. Renewed February 11, 1931.

This invention relates to a hopper and gate adapted to be used in connection with a storage bin for transferring material therefrom to a hoisting bucket, or the like.

The general object of the invention is to provide a device of this character which is simple in its construction and easy to operate, which will usually load the bucket uniformly to its full capacity, and which will be automatically closed as the hoist is started without the liability of spilling any of the material.

The invention may be understood by reference to one illustrative embodiment shown in the accompanying drawings, in which:

Figure 1 is a side elevation of the device showing the bucket in position for filling, but with the gate closed.

Figure 2 is a front elevation of the same.

Figure 3 is a longitudinal section showing the gate in open position for filling the bucket.

Figure 4 is a similar view showing the bucket raised far enough to close the gate.

The invention is illustrated in connection with a storage bin or hopper 5, having an outlet 6 with a spout or bin chute 7, bolted or otherwise secured to the bin, and leading downwardly and outwardly from the opening 6, so that the contents of the bin may be discharged therefrom by gravity. A hoisting or conveyer bucket 8, of any suitable construction, is adapted to be lowered into position to receive the material as it is discharged from the bin chute 7. In the form illustrated, the bucket 8 is provided at each side with a pair of wheels 9, which are adapted to be guided between inclined tracks 10, and to maintain the bucket in upright position as it is lowered to filling position. A suitable abutment 11 (Fig. 4) is arranged to stop the bucket when it reaches filling position. The bucket is provided with suitable hoist means, in this instance, a bail 12, having a sheave 13 mounted thereon, about which passes a hoisting cable 14 which passes to a power driven hoist drum (not shown).

A heavy hinge pin 15 is mounted in lugs 16, located beneath the upper end of the bin chute 7. Its precise location is immaterial. The bin chute is adapted to be closed by a gate of the radial undercut type, consisting of two sides 17, hinged on the pin 15 at opposite sides of the bin chute, and rigidly connected at their outer ends by a curved plate 18, which is concentrically disposed with respect to the hinge pin 15. The sides of the bin chute 7 terminate in arcuate edges 19 which conform to the surface of the plate 18, so that when the latter is raised, as shown in Figure 4, the lower end of the bin chute is completely closed.

A sleeve or chute 20 is rigidly connected to the upper edge of the plate 18 and to the sides 17, and when the bucket is lowered and the gate opened, as shown in Figure 3, directs the material from the bin chute 7 into the bucket until the latter is filled. A rope or cable 21 is attached at one end to the upper side of the sleeve 20, and passes upwardly over a sheave or winch 22, and has a counterweight 23 connected to its other end. The counterweight is barely heavy enough to balance the gate and its attachments and to hold it in closed position, but the sheave or winch 22 may be easily turned by means of a crank 24, or other suitable means to lower the gate after the bucket is in position to be filled.

After the bucket is in position to be filled, and the gate lowered to the position shown in Figure 3, the material, which is in the storage bin, will flow by gravity into the bucket. It will be noted that in the loading position, the lower end of the sleeve 20 extends to or below the level of the top of the bucket, so that the material in the storage bin can be permitted to flow until it comes to rest, without any being spilled over the top of the bucket because of the angle of repose of the material. It will also be noted that a pair of flapper arms 25 are pivoted to opposite sides of the sleeve 20, and are adapted to extend down inside the bucket and rest against one side of the same. The flapper arms 25 are connected by a cross rod 26, against which the lower side of the sleeve 20 rests, when the gate is opened for filling the bucket. As the hoist begins to operate, and the bucket is guided upwardly by the tracks 10, the flapper arms 25 are carried upwardly by the edge of the bucket, and the rod 26 bears against the lower face of the sleeve 20, raising the latter and closing the gate, as will be understood from Fig. 4. During the rise of the gate, some of the material in it will pass into the bucket to complete the filling thereof. Suitable wear strips 27 may be provided on the rim of the bucket for engagement by the arms 25.

As the bucket 8 continues to rise, and as the gate approaches closed position, as shown in Figure 4, the arms 25 slip from the edge of the bucket and fall by gravity to the position shown in Figure 1, so as to leave a clear passage for the bucket when it is again lowered to loading position. When the gate has been automatically closed by the upward movement of the bucket, it is held in this position by the counterweight 23, until it is lowered by the means provided for that purpose after the bucket is again in position to be filled.

The relative positions of the bin chute, the gate and the bucket are such that the flow of material automatically stops as soon as the bucket is full, and as the bucket is raised, the gate closes without spilling any of the material. Preferably, the upper wall of the bin chute 7 is partly cut away, as shown at 28, so that the material filling the hopper and sleeve 20 will not choke up to prevent the free closing of the gate.

From the foregoing description, it will be noted that the present invention will automatically prevent any material from being spilled when the bucket is being loaded, while the ordinary type of gate depends entirely upon the vigilance of the operator to shut the gate when the bucket is full, in order to prevent spilling. It is not necessary for the operator to see the gate while manipulating the same, since the bucket will always be uniformly loaded to nearly its full capacity, and the material will then automatically cease to flow. The time and effort of the operator in closing the ordinary type of gate is saved when the present invention is used, since the operator starts his hoist as soon as the flow of material into the bucket stops, or whenever most convenient, and the gate is automatically closed while the bucket is being hoisted.

The bucket shown more or less diagrammatically in the drawings of this application is described and claimed in the pending application of A. C. Bennett, Serial No. 63,938, filed October 21, 1925, which is assigned to the assignee of the present application.

Obviously the present invention is not restricted to the particular embodiment thereof herein shown and described. Moreover, it is not indispensable that all the features of the invention be used conjointly since they may be employed advantageously in various combinations and sub-combinations as defined in the claims.

What is claimed is:

1. The combination with a storage bin having an opening with a downwardly inclined bin chute leading therefrom, of a hoisting bucket, a combined gate and chute mounted on said bin chute and movable upwardly into position to close the bin chute and downwardly into position to direct material from the bin chute into the bucket, and means engageable by the bucket, when the latter is hoisted, to raise the chute and close the gate, said means being pivoted to the chute in such a position as to drop by gravity to afford clearance for the bucket as the latter is returned to filling position.

2. The combination with a bin chute adapted to be attached to a storage bin so as to lead downwardly therefrom, of a hoisting bucket, a gate pivoted to the bin chute and adapted to close and open the outlet therefrom, a chute rigidly connected to the gate in position to form a continuation of the bin chute when the gate is open, a pair of flapper arms pivoted to the sides of the chute, a rod connecting the flapper arms and engageable with the under side of the chute to raise the latter and close the gate when the flapper arms are swung upwardly, said flapper arms when lowered being in a position to be engaged and swung upwardly by the ascending bucket and dropping by gravity as soon as the bucket has passed them.

3. The combination with a bin chute having a downwardly inclined bottom and having sides terminating at the lower end in arcuate edges, of means for discharging material from said bin chute into hoisting bucket placed therebeneath, said means comprising a gate having side portions disposed at opposite sides of the bin chute and pivoted on the latter, a curved plate connecting the outer ends of said side portions and cooperating with said arcuate edges to close the lower end of the bin chute when the gate is raised, a chute rigidly connected to said side portions and to the upper edge of said curved plate and forming a continuation of the bin chute when the gate is lowered, and means pivoted to the chute and engageable by the bucket when the latter is hoisted to raise the chute and close the gate.

4. A device for discharging material from a hopper into a hoisting bucket, comprising a combined gate and chute movable into a position to discharge into the bucket when the latter is lowered, and means engageable by the bucket when the latter is hoisted to raise the chute and close the gate, said means being pivoted to the chute in such a position as to drop by gravity to afford clearance for the bucket as the latter is returned to filling position.

5. The combination with a bin chute having an outlet, of a gate pivoted to the bin chute and adapted to open or close said outlet, an extension chute rigidly connected to the gate in a position to form a continuation of the bin chute when the gate is open, a pair of flapper arms pivoted to the sides of the extension chute, a rod connecting the flapper arms and engageable with the underside of the extension chute to raise the latter and close the gate when said flapper arms are raised by the engagement therewith of an ascending bucket, said flapper arms being adapted to drop by gravity as soon as the bucket has passed them.

6. Apparatus of the character described comprising, in combination, a hopper; a pivoted gate closing the hopper when in raised position and opening the hopper when lowered; a chute rigidly fixed upon the gate to provide a hopper extension when the gate is lowered; a bucket; a hoist rope supporting the bucket; pairs of spaced rollers on opposite sides of the bucket; guides for the bucket rollers extending in a plane inclined relative to the vertical and serving to guide the bucket as it approaches the gate for filling and also engaging the rollers so as to prevent tilting of the bucket after being filled; stops at the lower ends of the guides upon which the bucket rests when in filling position; the chute extending as far as the mouth of the bucket when the gate is lowered; means carried by the chute and gate assembly and entering the bucket when the gate is open and contacting with the chute when the bucket is first elevated, to effect elevation of said assembly and close the hopper; said means being movable by gravity out of the way of the bucket when it has been elevated above the gate; and a counterweight connected with the chute and gate assembly.

7. The combination with a bin chute adapted to be attached to a bin or hopper so as to lead downwardly therefrom, of a hoisting bucket; a gate pivoted to the bin chute and closing the same when elevated and permitting flow of materials therefrom when lowered; an extension chute rigidly connected to the gate above the same and providing a continuation of the bin chute when the gate is lowered; a pair of flapper arms pivoted to the extension chute and depending therefrom; a rod connecting said flapper arms and engageable with the underside of the extension chute; the flapper arms being spaced apart a distance greater than the width of the extension chute and being sufficiently long to extend down inside the bucket and rest against the edge thereof when the bucket is in filling position; the rod being in contact with the bottom wall of the extension chute on the outside thereof to hold said chute spaced from the edge against which the flapper arms rest and to effect upward swinging of said chute and closing of the gate immediately after the bucket starts upwardly.

In testimony, that I claim the foregoing as my own, I have hereto affixed my signature.

CLAIR M. ROOT.